United States Patent
Dalakuras et al.

(10) Patent No.: US 7,269,675 B2
(45) Date of Patent: Sep. 11, 2007

(54) METHOD AND DEVICE FOR MONITORING A BUS SYSTEM AND BUS SYSTEM

(75) Inventors: Lambros Dalakuras, Birkenfeld (DE); Frank Schmidt, Leonberg (DE); Juergen Hirt, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 660 days.

(21) Appl. No.: 10/256,559

(22) Filed: Sep. 26, 2002

(65) Prior Publication Data

US 2003/0158983 A1 Aug. 21, 2003

(30) Foreign Application Priority Data

Sep. 26, 2001 (DE) .................. 101 47 446

(51) Int. Cl.
*G06F 13/00* (2006.01)
*G06F 13/362* (2006.01)
(52) U.S. Cl. ....................... 710/107; 710/713
(58) Field of Classification Search ................ 710/107, 710/13; 713/160
See application file for complete search history.

(56) References Cited

U.S. PATENT DOCUMENTS

| | | | | |
|---|---|---|---|---|
| 5,034,980 A | * | 7/1991 | Kubota | 713/189 |
| 5,293,496 A | * | 3/1994 | White et al. | 710/108 |
| 5,553,261 A | * | 9/1996 | Hasbun et al. | 711/103 |
| 5,686,898 A | * | 11/1997 | Willard et al. | 340/2.8 |
| 5,987,376 A | * | 11/1999 | Olson et al. | 701/201 |
| 6,098,133 A | * | 8/2000 | Summers et al. | 710/107 |
| 6,396,408 B2 | * | 5/2002 | Drummond et al. | 340/815.4 |
| 6,654,833 B1 | * | 11/2003 | LaBerge | 710/107 |
| 7,058,179 B1 | * | 6/2006 | Maruo et al. | 380/211 |

FOREIGN PATENT DOCUMENTS

| | | |
|---|---|---|
| DE | 4 301 436 | 7/1994 |
| DE | 199 60 959 | 7/2001 |
| EP | 0 704 351 | 12/1999 |
| GB | 2 351 588 | 3/2001 |

* cited by examiner

*Primary Examiner*—Emmanuel L. Moise
*Assistant Examiner*—Ali Abyaneh
(74) *Attorney, Agent, or Firm*—Kenyon & Kenyon LLP

(57) ABSTRACT

A method and device for monitoring a bus system and bus system having at least two users, of which at least one is structured as an authorized user and monitors the data transmission on the bus system, an identifier being transmitted and the identifier being uniquely allocatable to one user for each data transmission on the bus system, the at least one authorized user comparing the identifier with a specified identifier, and if both identifiers are the same taking measures in order to prevent an execution of the data to be transmitted if the data transmission is initiated by a user other than the at least one authorized user.

13 Claims, 2 Drawing Sheets

METHOD AND DEVICE FOR MONITORING A BUS SYSTEM AND BUS SYSTEM

FIELD OF THE INVENTION

The present invention relates to a method and a device for monitoring a bus system having at least two users as well as a corresponding bus system.

BACKGROUND INFORMATION

The networking of control devices, sensors, and actuators with the help of a communication system, i.e., a bus system, has drastically increased in recent years not only in the construction of modern vehicles but also in mechanical engineering, in particular in the machine tool sector and in automation. In the process, synergy effects can be achieved by distributing functions to a plurality of control units. These are the distributed systems. The communication between different users of such distributed systems is increasingly taking place over a bus or a bus system. The communication traffic on the bus system, access and receiving mechanisms, as well as error processing, is regulated via a protocol.

The CAN (controller area network) is the established protocol in the automotive sector. This is an event-controlled protocol, i.e., protocol activities, such as sending a message, are initiated by events having their origin outside the communication system. Unique access to the communication system or bus system is achieved through priority-based bit arbitration. This is on condition that each message is allocated a unique priority corresponding to the ID. The ID in the CAN is uniquely allocated here to the message content of a data transmission. The CAN protocol is very flexible, making the addition of other nodes and messages possible without any problem as long as there are still free priorities, also called IDs or message identifiers. The collection of all messages with priorities and their transmitting nodes, and possibly receiving nodes, to be sent in the network, are stored in a list, the communication matrix. CAN systems are often designed such that there is a unique allocation of the IDs to particular preselectable users.

The bit-synchronous interface, BSS, is known as another protocol on a bus system. It is used, for example, as a communication protocol between control unit and generator regulator for set-point regulation and status display, and also as a diagnostic interface for vehicle workshops, etc. The structure of the BSS protocol corresponds to that of a master/slave protocol. A master communicates with up to a maximum of 8 slaves that are connected via a linear bus line. An unshielded physical single core line serves as a transmission medium for the pulse-width modulated bits. The master transmits synchronizing impulses at all times, which can be overwritten by information bits, and, as the sole bus user, is able to initiate a data exchange. Through one message, the master can communicate with only one slave at any given time. In the BSS protocol, for example, a message telegram includes 3 synchronizing bits and 19 information bits. Before each message, at least 3 synchronizing bits are sent, for instance, in order to facilitate a synchronizing of the slave. These synchronizing bits, as initiator of the data transmission, are consequently transmitted by the master as part of the data transmission on the bus system.

As with BSS, LIN (local interconnect network) is a master/slave bus whose users are connected via a logical bus line. A maximum of one master and up to 64 slaves belong to each bus. An unshielded physical single core line serves as transmission medium. The LIN protocol divides the sending and receiving process into two tasks. The master task contains the synchronization and addressing, and the slave task contains the data. Both master task and slave task are summarized in a MessageFrame. A master can execute the master task as well as the slave task. Each data transmission has a MessageFrame, in which the synchronization as well as the data information are transmitted. Byte fields, the individual sections of the message, have the same format as a serial interface in an 8N1 transmission. This means 8 data bits, no parity bit, and 1 stop bit. At the start of every message, the master sends a SynchBreak as a synchronization signal in order to fetch the slaves from a possible idle state and to facilitate synchronization. Here, the SynchBreak includes two different parts: a first part, a bus-dominant signal of fixed duration, in particular 13 bits long. The second part corresponds to a bus-recessive signal of fixed duration, in particular 1-bit.

As in the examples mentioned, there is a plurality of bus systems that can be used as a communication link between users, in particular in distributed systems. Protection from unauthorized access to these systems is gaining more and more importance here. In bus systems in motor vehicles today, the data is for the most part transmitted without protection. If the bus line is connected by an unauthorized user, it can send commands that trigger the release of the central locking mechanism, for example, and consequently, an unlocking of the vehicle. In general, such unauthorized access to a bus system is associated with a high hazard potential, for example, in automation or in anti-theft protection in motor vehicles.

Nevertheless, in order to ensure a certain amount of protection from unauthorized access, the bus line is installed only in places where it is especially difficult for an intruder to tap the bus line. In especially critical applications, e.g., starting the vehicle engine, the data is also sent encrypted, as a rule. The encryption of the data is often associated with a very high cost. Nevertheless, a majority of the algorithms used may be decoded by an unauthorized user with a certain amount of effort and knowledge.

SUMMARY OF THE INVENTION

An object of the present invention, therefore, is to provide a method and a device or, as the case may be, a corresponding bus system that is protected from such unauthorized access.

This object is achieved by a method and a device for monitoring a bus system as well as a corresponding bus system having at least two users, of which at least one user is structured as an authorized user and monitors the data transmission on the bus system, an identifier being transmitted and the identifier being uniquely allocatable to one user for each data transmission on the bus system. The at least one authorized user advantageously compares the identifier with a specified identifier, taking measures if the two identifiers are the same in order to prevent an execution of the data to be transmitted if the data transmission corresponding to the identifier is initiated by a user other than the at least one authorized user.

Bus systems are thus advantageously protectable from unauthorized access. The method, the device, as well as the bus system, are advantageously not connected to a specific bus system; nor is it like a certain bus access method, or a master/slave or a multimaster system. Likewise, usage is still possible if data is transmitted in an already encrypted form.

Advantageously, no additional hardware is required in order to implement the method. Furthermore, it is also advantageous that security from unauthorized access is thus increased, that greater flexibility is possible in the design of distributed applications, and that very little or no additional cost is involved. Further cost savings also arise, depending on the application and the bus topology, when additional encryption is dispensed with so that no computing power need be for encryption algorithms.

Furthermore, the method and the device, as well as the bus system, are simple to manage and may advantageously also be easily integrated into existing bus systems.

Thus, it is expediently possible, as well as desirable from a technical and commercial point of view, to network other systems, such as integrated electronics in the external mirror of motor vehicles, for example, with other components, such as lock electronics, a comfort control device, etc., in order to help reduce the cost of the entire system.

In an advantageous embodiment, measures that prevent the data transmission from being completely executed on the bus system are initiated as measures to prevent an execution of the data to be transmitted. It is expedient to prevent a complete data transmission in such a way that the data to be transmitted is at least partially destroyed by the authorized user, for example, by overwriting the data with a bus-dominant signal or by grounding the bus system for a definite, preselectable duration.

In an expedient embodiment, the at least one authorized user monitors the data transmission by comparing the identifiers only for specified or specifiable events.

It is furthermore advantageous to prevent an execution of the data to be transmitted in such a way that the data to be transmitted is labeled invalid by the authorized user, such that a user, as recipient of the data, recognizes it as invalid and rejects it.

In a particular embodiment, each user of the bus system is structured as an authorized user.

In an advantageous embodiment of the present invention, the bus system is a LIN bus system, the user that also triggers the data transmission being intended as the authorized user, a synchronization signal, a SynchBreak of a user structured as a LIN master, being used as an identifier, for example, and the user structured as a LIN master also being structured as an authorized user.

In another advantageous embodiment, the bus system is a CAN bus system, the ID of the CAN bus data transmission being used as an identifier, in this CAN case the ID being uniquely allocated to a user in such a way that only this user transmits the data contents belonging to this ID, at which time a comparison of the IDs may then take place.

In a further advantageous embodiment, the bus system is a BSS bus system, the user intended as the authorized user also being the one that triggers the data transmission, and a synchronization bit signal of the user structured as the BSS master being used as an identifier, for example, with the user structured as the BSS master likewise being structured as an authorized user.

With the present invention and the embodiment according to the present invention, it is consequently possible to prevent the scenario in which an unauthorized user gains access to the bus lines in the bus system in order to trigger particular functions, i.e., to prevent unauthorized access.

DETAILED DESCRIPTION

Figure 1:
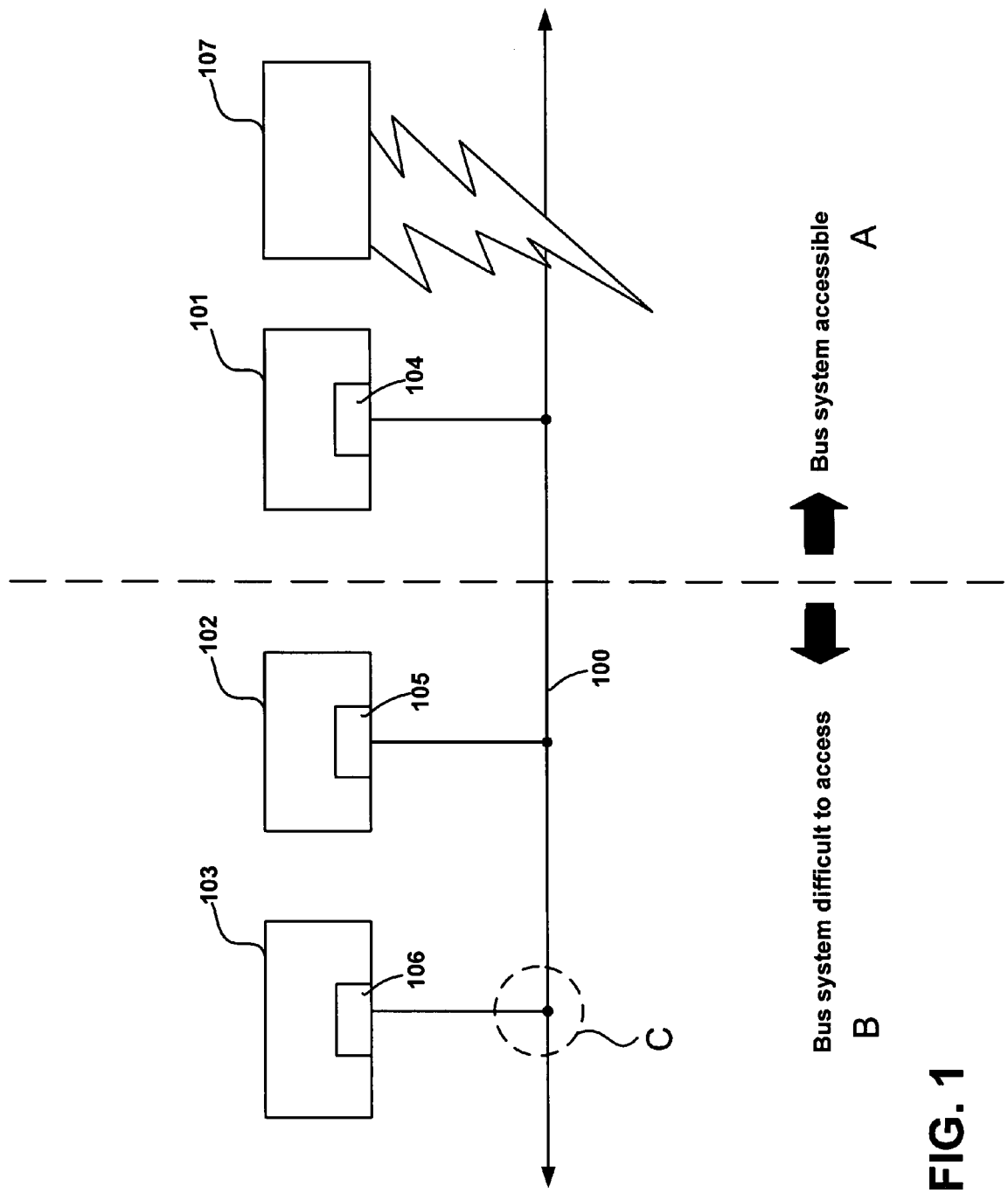
FIG. 1 shows a bus system, on which an unauthorized access is performed.

FIG. 1 shows a bus system 100 having bus users 101, 102, and 103. Bus users 101 to 103 are connected to bus 100 via bus interfaces 104 to 106. Here, the bus system is divided into two areas: an area A, in which the bus system is accessible to unauthorized access, in particular through additional measures, such as, for example, the breaking off of an exterior mirror, etc., and an area B, in which the bus system is difficult to access, in particular the vehicle interior, for example.

Element 107 illustrates an unauthorized bus access, for example, by connecting a laptop to the bus line. In this scenario, the master user is represented by 103, for example, for a LIN or BSS application.

In the bus system shown, users 101 and 103 are authorized users, for example. But the specification of all users or nodes 101 to 103, etc., as authorized users, is also possible. An authorized user means that this user monitors the bus system in such a way that the bus traffic, i.e., the data transmission on the bus system, is monitored and that the user may take appropriate measures in response to unauthorized access.

Authorized users thereupon make a comparison of an identifier within the data transmission with at least one identifier specified for this user. As a result of the unique identification specification of one or more identifiers for each user, when the authorized user has not initiated a data transmission itself and a similarity in the identification is determined, there is an unauthorized bus access and corresponding measures are taken. These authorized users may either constantly monitor the bus traffic or may also receive the bus messages only for certain events. Such events are, for example, a wake-up of control units or users from a sleep or power down mode, or, for example, the start or the execution of the same in the control unit tracking or system tracking, etc.

Specific transmission messages or the corresponding identifiers are uniquely allocated in a suitable manner to a user authorized in this way.

In a CAN bus system, for example, a user may administer a plurality of identifiers or messages with this identifier. Each of these identifiers, however, is uniquely allocatable to one user. Such identifiers are, for example, the identifiers or IDs in the CAN or LIN bus, the Synch Break in the LIN bus, or also the synchronization identifier, for example, 3 sync bits or also only one thereof in the BSS bus.

Figure 2:
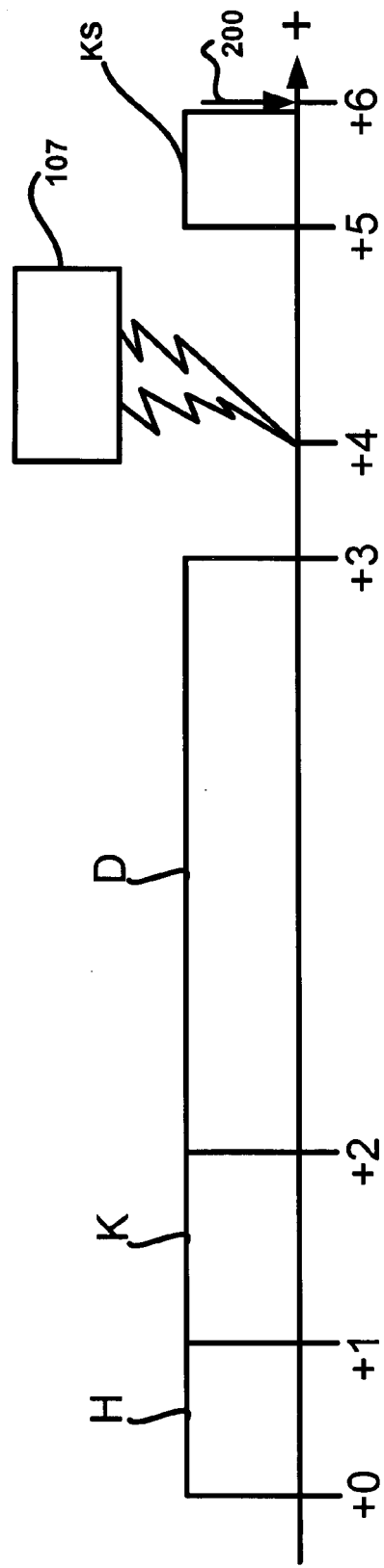
FIG. 2 schematically shows a data transmission on the bus system.

This message structure is described in FIG. 2. Here, a data transmission of the authorized user 101 takes place on the bus system, for example. The actual data content is transmitted (D) here from t2 to t3 and an identifier K, for example from t1 to t2, before the actual data content.

A header H of the data transmission from t0 to t1, which in CAN bus transmissions includes, for example, synchronizing bits and the like, is furthermore available and optional. Parity sums and checksums, bits, and the like are contained in block D in the illustration in FIG. 2 and are not explicitly illustrated.

At time t4, for example, an unauthorized bus access, represented by element 107, is initiated. Here, the authorized user 101 is simulated as a bus user, for example. A simulated identifier KS, which in this case corresponds to an identifier of authorized user 101, is sent via the bus from t5 to t6. At t6, at the latest, authorized user 101 recognizes that an identifier allocated to it is transmitted via the bus, although authorized user 101 itself did not initiate any data transmission. As a result, authorized user 101 on its part introduces measures in order to prevent an execution of the data of the unauthorized access or the complete transmission of this data. This may happen, for example, through a dominant overwriting of the data or a grounding of the bus system, shown in 200, as a result of which all subsequent data is destroyed. It is equally possible to append such information in bit or byte form to an unauthorized data packet, in order to make this invalid for a possible recipient, so that this does not execute the data packet or the functions arising therefrom, but rejects the data as invalid or deletes it, on the basis of appended or altered bits or bytes.

If an unauthorized user sends a message, which an authorized user identifies as its own transmission message, corresponding measures will be taken by the authorized node in order to tag the message for the recipient as invalid. The authorized user ideally destroys the message by either dominantly overwriting the data, as mentioned, or also by grounding the bus so that the data does not even arrive at the recipient's. If such dominant overwriting is not possible on account of the bus access method, the authorized node, for example, may immediately inform the recipient that this is an invalid message. Alternatively, other further measures are also possible, such as, for example, the sending of error frames, blocking of functions, or stopping of the bus traffic, etc., by the authorized node monitoring the bus traffic.

In a concrete embodiment, the following sequence of events forms the basis, for example:

An unauthorized user tries to send a message on the data bus without authorization by connecting a laptop or a different device to the bus lines, as shown in FIG. 1 with element 107, to simulate the bus communication. An identifier, for example, the message ID or also a synchronization signal, such as the SynchBreak of the LIN bus or the synchronization of the BSS bus to the user, for example 102, is initially sent by the unauthorized user. Control unit or bus user 103, in particular a master/slave topology as a LIN or BSS master, in this example, recognizes from the message ID, or in the case of a LIN bus, from the SynchBreak, that only it itself is allowed to send this message.

As a result, control unit 103, in particular the LIN master, dominantly grounds bus 100 here so that the command data that the unauthorized user sends is destroyed.

As a result, the message or the data transmission from control unit 102 or user 102 is recognized as invalid. In order to prevent such a dominant overwriting of the data transmission by user 103, the intruder would also have to separate the bus line at point C. However, spatial conditions make this almost impossible. But in this example, a dominant signal coincides with the ground potential, which need not inevitably be the case.

In a particularly secure variation, each user of the bus system is structured as an authorized user. Here, the data need not be completely destroyed; instead, a partial destruction of the data or an overwriting of this data is sufficient in order to make this invalid or no longer legible. An identifier in the particular bus system is chosen here in such a way that the response by the bus user, in particular through the dominant signal, is possible on the corresponding bus system in time before the transmission of the data, or in such a way that an execution of the data, i.e., the function, may be prevented.

This creates a simple and cost-efficient solution that facilitates a high security standard, in particular for distributed applications with security-relevant data for all bus systems, in particular multiplex systems, not only in the automotive sector, but also in automation and in mechanical engineering.

What is claimed is:

1. A method of monitoring a bus system having at least two users, comprising:
   structuring at least one of the at least two users of the bus system as at least one authorized user that monitors at least some of a plurality of data transmissions on the bus system;
   for each of the monitored data transmissions:
      transmitting an identifier uniquely allocatable to one of the at least two users;
      causing the at least one authorized user to compare the respective identifier with another identifier; and
      if, and conditional upon that, (a) the respective identifier and the other identifier are the same and (b) the respective data transmission is initiated by a user other than the at least one authorized user, implementing a measure in order to prevent an execution of the respective data to be transmitted;
   wherein at least one of the monitored data transmissions is initiated by the user other than the at least one authorized user.

2. The method as recited in claim 1, wherein:
   the measure is initiated as a measure to prevent a complete execution of the respective data to be transmitted.

3. The method as recited in claim 2, further comprising:
   for the at least one of the monitored data transmissions, preventing a complete data transmission in such a way that the data to be transmitted of the at least one of the monitored data transmissions is at least partially destroyed by the at least one authorized user.

4. The method as recited in claim 3, wherein:
   the data of the at least one of the monitored data transmissions to be transmitted is destroyed by the at least one authorized user in such a way that the data of the at least one of the monitored data transmissions is overwritten with a data signal dominant for the bus system.

5. The method as recited in claim 1, wherein:
   the at least one authorized user monitors the at least some data transmissions by comparing the at least some data transmissions' respective identifiers only for a specified event.

6. The method as recited in claim 1, wherein:
   the execution of the respective data to be transmitted is prevented in such a way that the respective data to be transmitted is labeled invalid by the at least one authorized user, such that a user, as recipient of the respective data, recognizes the respective data as invalid and rejects the respective data.

7. The method as recited in claim 1, wherein:
   the at least one authorized user includes each of the at least two users.

8. The method as recited in claim 1, wherein:
   the bus system includes a LIN bus system, and
   the at least one authorized user triggers at least one of the monitored data transmissions.

9. The method as recited in claim 8, wherein:
each identifier includes a synchronization bit signal of one of the at least two users structured as a LIN master, and
the at least one authorized user includes the one of the at least two users structured as the LIN master.

10. The method as recited in claim 1, wherein:
the bus system includes a CAN bus system,
each one of the at least two users transmits an ID before the data transmission,
at least one ID is allocated to each one of the at least two users, and
the at least one authorized user compares the at least one ID allocated thereto with another ID transmitted on the bus system.

11. The method as recited in claim 1, wherein:
the bus system includes a system corresponding to BSS, and
the at least one authorized user triggers at least one of the monitored data transmissions.

12. The method as recited in claim 11, wherein:
the at least one authorized user includes a user structured as a BSS master, and
at least one of the monitored data transmission's identifier includes at least one synchronization bit signal of the at least one authorized user.

13. The method of claim 1, wherein, with respect to each of the at least two users:
the respective user is allocated a respective identifier;
the respective user monitors the each of the monitored data transmissions on the bus; and
the respective user, for a particular one of the at least one of the monitored data transmissions, implements the measure to prevent the execution if the transmitted identifier of the particular monitored data transmission is the same as the identifier allocated to the respective user and the data of the particular data transmission was not transmitted by the respective user.

\* \* \* \* \*